J. W. McNEAL.
CHECKROW CORN PLANTER.
APPLICATION FILED FEB. 12, 1918.
1,353,927.
Patented Sept. 28, 1920.
3 SHEETS—SHEET 3.
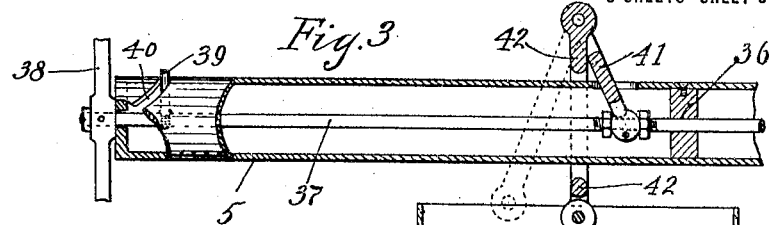
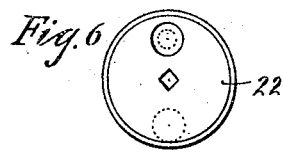
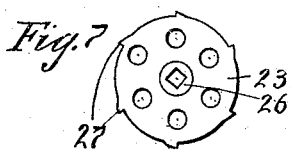
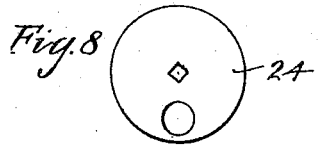
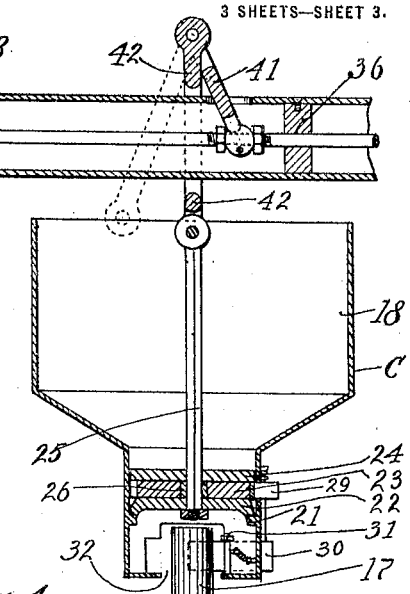
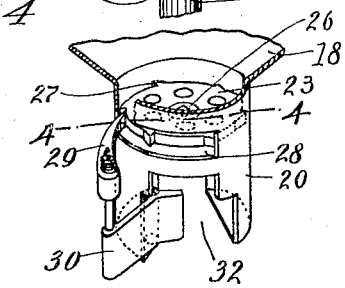
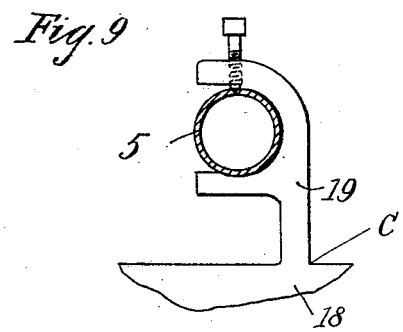
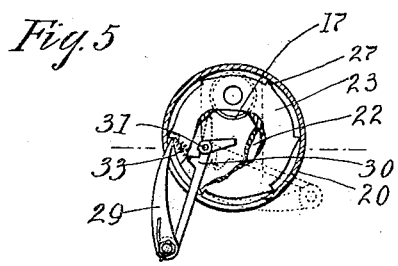
Inventor,
Joseph W. McNeal
his Attorney.

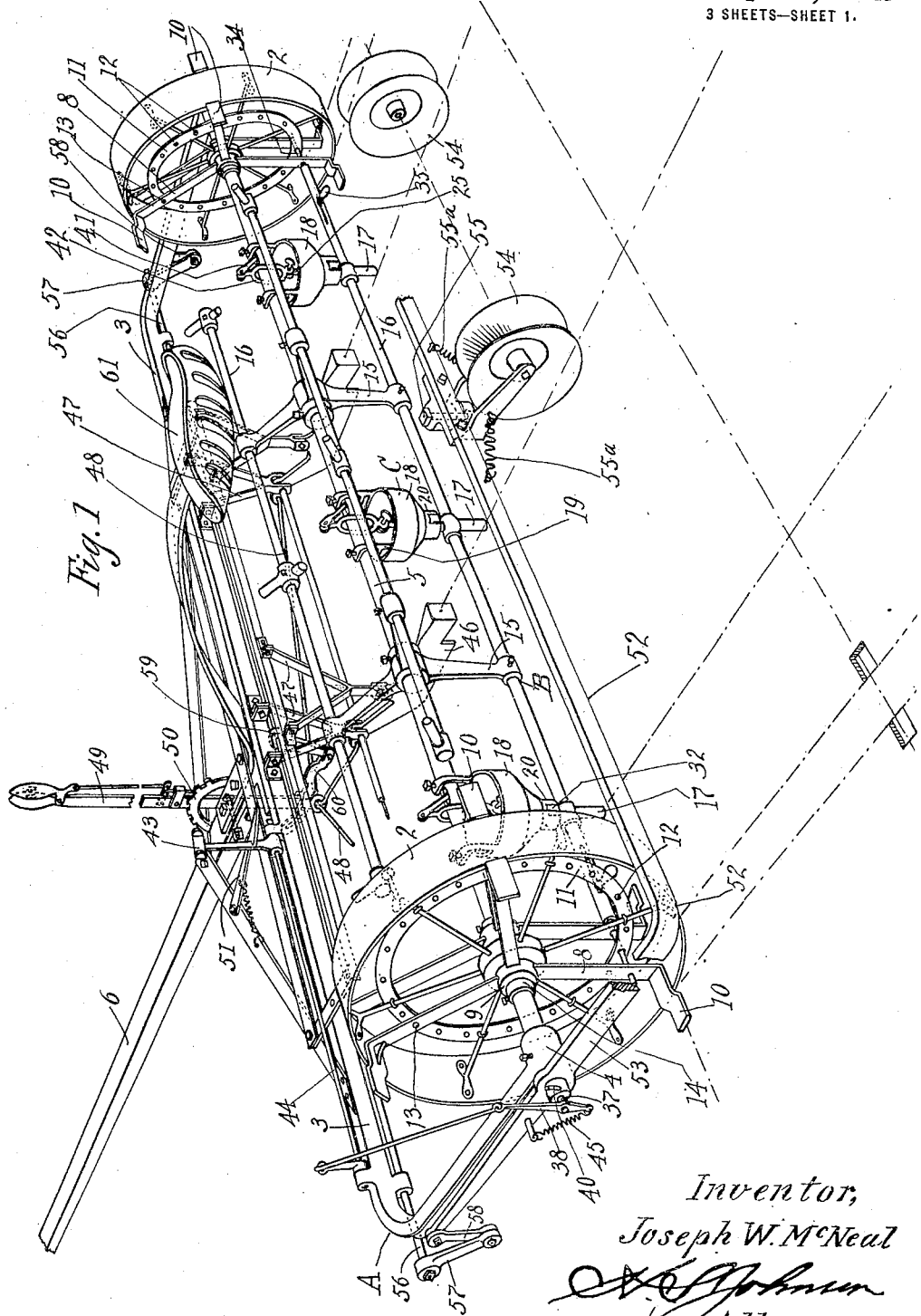

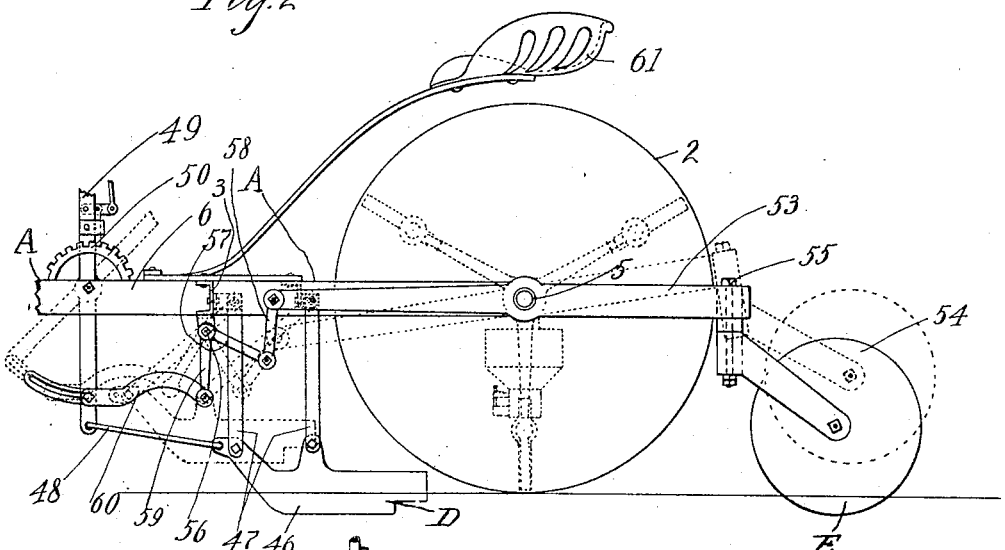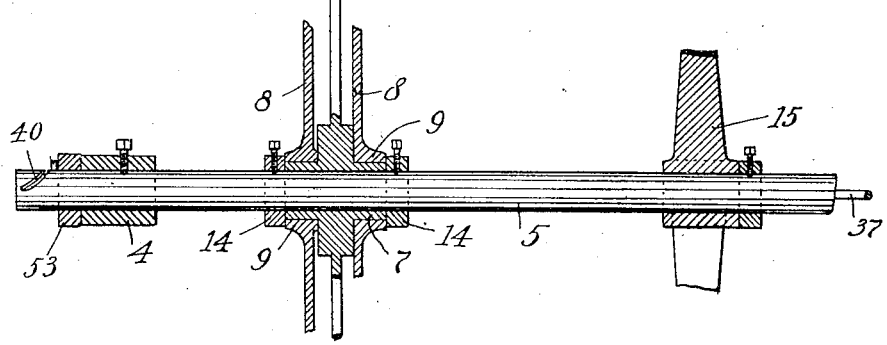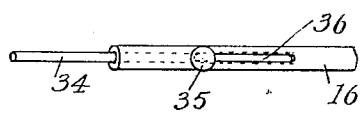

UNITED STATES PATENT OFFICE.

JOSEPH W. McNEAL, OF ST. PAUL, MINNESOTA.

CHECKROW CORN-PLANTER.

1,353,927.  Specification of Letters Patent.  Patented Sept. 28, 1920.

Application filed February 12, 1918. Serial No. 216,786.

*To all whom it may concern:*

Be it known that I, JOSEPH W. MCNEAL, a citizen of the United States, residing at St. Paul, in the county of Ramsey and State of Minnesota, have invented certain new and useful Improvements in Checkrow Corn-Planters, of which the following is a specification.

This invention relates to check-row corn planters, and has for its object, to provide in a machine of this class means for planting corn in check rows without the use of a wire commonly employed.

A further object of the invention is to provide a machine wherewith corn may be evenly checked on rough as well as on smooth ground and which has conveniently resettable devices, whereby the parts may be reset into proper check at any time between the ends of the rows, when, by reason of uneven travel the planter gets out of check and renders the rows uneven.

Another object of the invention is to provide a machine of this class embodying certain novel features of construction wherethrough the machine may be built of sufficient width to plant three or more rows at a time.

The invention consists in the construction, combination and arrangement of parts, shown in the drawings, and described in the specification of which the drawings form a part.

Figure 1 is a perspective view of a corn planter, embodying my invention.

Fig. 2 is a diagrammatic side elevation of Fig. 1 showing the range of movement of some of the parts.

Fig. 3 is a fragmentary sectional view of the seed box and adjacent parts.

Fig. 4 is a fragmentary perspective view of the seed feed mechanism.

Fig. 5 is a sectional plan view on line 4—4 of Fig. 4.

Figs. 6, 7 and 8 are plan views of details of the seed feed mechanism.

Fig. 9 is a side view of the seed box hanger.

Fig. 10 is a fragmentary sectional view of part of the shaft and mountings thereon.

Fig. 11 is a detail of the reel locking device.

Referring to the drawings (Fig. 1) the invention comprises a rigid element or frame A, supported on wheels 2, a rotary element B including a reel and the wheels 2, the reel being attachable thereto to move therewith, and seed corn dispensing devices C supported in the frame A, and within the reel.

The invention further comprises furrow cutting mechanism D and furrow closing devices E, all movably hung in the frame A.

The frame A comprises a bail, composed of a front bar 3 and a pair of side bars terminating in a hub 4 wherein is rigidly held by set screws the hollow shaft 5. The frame further comprises a suitably braced draft bar 6 projecting outwardly from the bar 3, to which it is rigidly secured.

On the shaft 5 are rotatably mounted the spoked wheels 2 (Fig. 10) which carry, rotatably, on their hubs 7 the markers 8, said markers comprising a plurality of arms, radiating from a centrally bored hub 9, each arm being formed at its outer end with a laterally projecting plate 10. In a flat faced locking ring 11 arranged concentric with the rim of the wheel 2 and secured to the spokes thereof, is a circular row of holes 12, which register with the holes 13, in the arms of the markers 8. A pair of retaining collars 14 setscrewed on the shaft 5 hold the wheels and markers against shifting.

The faces of the plates 10 project slightly beyond the periphery of the wheels 2, thereby causing the plate to be impressed into the soil and leave a clearly visible mark therein. Further, the plates 10 are, circumferentially equidistant from each other, so as to leave equidistant imprints in the soil as the machine is drawn thereover, when the marker is locked to the wheel, which will hereinafter be explained.

The rotary element B of which the wheels 2 form a part, comprises a reel composed of spiders 15 rotatably mounted on the shaft 5 and carrying, adjustably, a plurality of laterally disposed hollow rods 16 arranged parallel with the shaft 5 and equidistant therefrom. Interspaced on the rods 16, and projecting outwardly at right angles thereto, and radial to the shaft 5 are a plurality of conductor tubes 17, through which the seed corn is directed into the soil.

The rods 16 have setscrew fastening in the spiders and may be turned therein so as to turn the tubes 17 sidewise, away from the ground and out of service. One of the hollow rods 16 (Fig. 11) is provided at its ends with a locking device, comprising a sliding bolt 34 fitting the hollow of the rod and having a handle 35 projecting through a slot 36 in the rod whereby the bolt may be moved to engage the holes (Fig. 1) 12 and 13, thereby locking the reel and wheels 2 together to cause them to move as a unit.

The reel is held against longitudinal movement by a pair of collars on the shaft 5. The seed dispensing devices C comprise a plurality of seed boxes 18 removably suspended from the shaft 5 by means of a pair of screw fastened hangers 19. The lower portion of the seed box is reduced in size and forms a cylindrical neck 20 having an inner annular bead 21 upon which rest the three coöperating disks 22, 23 and 24, each having a central square hole through which passes slidingly the rod 25 on which the disks may be strung and retained by a nut at the lower end of the rod.

The disk 23 has a central circular portion 26 allowing the disk to be rotated about the rod 25, the disk being provided with interspaced teeth 27 on its periphery. Engaging said teeth through a slot 28 in the neck 20 is a spring pressed pawl 29 pivotally mounted on a dog 30 which rotates about the pin 31 mounted in the bottom of the neck 20 and projects into the passage 32 to obstruct the latter.

A spring 33 tends constantly to keep the dog in the position shown in Fig. 5 wherein one of the openings in disk 23 is shown in register with the opening in the disk 22, the three disks being superimposed one upon another (Fig. 3). The disks are strung on the rod 25 in a manner to bring the openings in disk 24 opposite the opening in disk 22 as shown in dotted lines Fig. 6.

Thus the kernels will first enter the opening in disk 23 and then pass through the opening in the disk 22 into the tube 17.

When the reel and the wheels 2 are interlocked and move together as above described, the upper portion of the tube 17, which travels in a path in alinement with the seed boxes 18, will enter the passage 32 and engage the dog 30 thereby moving the dog and pawl 29 into the position indicated in dotted lines in Fig. 5.

Thus the disk 23 is intermittently moved as the reel is turned, each move causing one of the holes in the disk to register with the hole in disk 22, thereby releasing a quantity of seed. The seed will fall into the tube 17, which arrives under the opening just after passing the dog 30, the dog being instantly returned by the spring 33, the tube 17 and the opening in disk 23 registering approximately at the same moment.

Having suitable bearings 36 wherein to turn and slide in the hollow of the shaft 5 is a shift rod 37, said rod supporting rigidly at its outer end an upturned lever 38, the moving of which will cause the pin 39 secured in the shift rod, to traverse the oblique slot 40 in the wall of the shaft 5, thereby moving the rod 37 longitudinally.

The strut arm 41 is pivotally connected with the rod 37, (having threaded nut adjustment therewith) and projects upwardly through a slot in the wall of shaft 5 and has pivotal connection with a link 42.

The link 42 surrounds the shaft 5 and has pivotal thumb screw connection with the rod 25.

Obviously, when the rod 37 is caused to move longitudinally as above described, the strut 41 through its connections will cause the three disks in the neck 20 to be lifted off the bead 21 and slide upwardly, thereby disengaging the pawl 29 and the disk 23 and therethrough stop the planting operation. When disengaged, the pawl will ride on the periphery of disk 22 which is beveled to the base of the teeth on disk 23. When it is desired to change the disk 23 for one of different capacity, the thumb screw connection in the link 42 may be broken and the link swung to one side (Fig. 3) whereafter the disks may be conveniently removed.

The lever 38 has operative connection with a foot lever 43 which is mounted on a rod journaled on the bar 3, said rod carrying an upturned sublever which has rod connection with the lever 38. The lever 38 has spring connection 45, which tends constantly to turn the rod 37 to the right, thereby shutting off the dropping of seed corn.

The pivotally hung spring controlled arm 51, holds the foot lever 43 in set position, the footlever being released by actuating said arm laterally to disengage the footlever, thereby causing it to be moved by the spring 45.

The furrow cutting devices comprise soil openers 46 which are of the sled runner type and are hung in the frame A on a pair of pivotally hung parallel hangers 47 all forward of the reel. The openers 46 have operative rods connection 48 with a controlling lever 49, said lever being fulcrumed in the frame and projecting above the main body of the machine. The ordinary pawl and rack connection 50 between the controlling lever 49 and the frame A serve to hold the lever in the various desired positions.

The seed covering devices comprise a secondary frame 52 encompassing the rear and sides of the main body of the machine and fulcrumed in side members 53 on the shaft 5 of the main frame A.

Mounted on the frame 52 and in alinement with the path of travel of the tubes 17 and the runners 46 are the covering wheels 54 which are of the caster type and are formed with sheave rims and have swivel bearings 55 in said frame. Springs 55ᵃ between the frame 52 and the caster housing effect a resilient side resistance.

Forward of the main body of the machine and journaled in the bar 3 of frame A is the shaft 56, carrying rigidly the lever 57 which has link connection 58 with the outer ends of the side members 53. Midway of its length on the shaft 56 and projecting downwardly therefrom is a lever arm 59 which has link connection 60 with the controlling lever 49.

A seat 61 is so positioned above the machine as to render the marker mechanism conveniently visible.

When the controlling lever 49 is drawn rearwardly, thereby lifting the runners 46 and the covering wheels 54 from the ground (Fig. 2) the machine may be freely turned for the return trip when the end of the row has been reached, the planting having been previously stopped by releasing the foot lever 43.

It will be noted that the path of the supporting wheels lies midway between the planted rows, thereby leaving undisturbed the loose soil previously prepared for seeding.

A further advantage resides in the novelty of construction which renders practical, for use on large flat fields, the construction of machines whereby a greater number of rows may be quickly and accurately planted at a time. Should the planter get out of check between the ends of the row or a new row be begun, the handle 35 and its bolt 34 is actuated to disconnect the wheels 2 from the reel, when the markers may be moved to proper position and again locked as before.

By having a marker on both sides of the wheel, I avoid the inconvenience of sighting through the spokes in the process of setting the markers. Many changes may be made in the details of construction without departing from the general principle disclosed.

I claim:

1. In a corn planter of the class described, the combination with the frame and supporting wheels therefor, of a reel rotatable on said frame between said wheels and connectible therewith, seed dispensing devices, having a seed discharge opening, and means including seed guiding devices on said reel to engage said dispensing devices and register with said discharge opening when said reel and wheels are connected and the latter are rotated as and for the purpose specified.

2. In a corn planter of the class described, the combination with the frame and supporting wheels therefor, of a reel rotatable on said frame, stationary seed dispensing devices within said reel and engageable therewith, and means for operatively connecting said reel and wheels to engage said seed dispensing devices to actuate them when said wheels are turned.

3. In a corn planter of the class described, the combination with the frame, of a rotary element including supporting wheels on said frame rotatable about a horizontal axis, and seed dispensing devices suspended below said axis on said frame and engaging said rotary element to be actuated thereby when said frame supporting part is actuated.

4. In a corn planter of the class described, in combination, a frame including a hollow shaft; wheels rotatable on said shaft; seed dispensing mechanism on said shaft and operatively connected with said wheels to be actuated thereby when said wheels are moved; and hand operable means in the hollow of said shaft for controlling said seed dispensing mechanism.

5. In a corn planter of the class described, in combination, a frame, supporting wheels therefor, seed dispensing devices operatively connected with said wheels to be intermittently actuated thereby when said wheels are actuated, marking means arranged on each of said wheels and connected to each other for making an imprint on the ground simultaneously with the actuation of said seed dispensing devices, and adjusting means for said marking means on each of said wheels for changing the relative position of said marking means.

6. In a corn planter in combination, a frame, supporting wheels therefor, and adjustable marking means on each of said wheels and on both sides thereof and connected together whereby interspaced imprints in the ground are effected when said wheels are turned.

7. In a corn planter in combination with the frame, including a shaft, wheels on said shaft for supporting said frame, of marking devices rotatable, independently of said wheels, and between the latter, other marker devices, one on the outer face of each wheel and registering with said first named marker devices, and means for locking all of said marker devices to said wheels for the purpose set forth.

8. In a corn planter in combination with the frame, including a shaft, wheels on said shaft for supporting said frame, of marking devices rotatable, independently of said wheels and adjacent to the sides thereof, and means for locking said marker devices to said wheels for the purpose set forth.

In testimony whereof I affix my signature in presence of two witnesses.

JOSEPH W. McNEAL.

Witnesses:
GEORGE VOELKER,
FLORENCE WINKLER.